United States Patent [19]

Beckers

[11] Patent Number: 4,596,345
[45] Date of Patent: Jun. 24, 1986

[54] ARRANGEMENT FOR ACTUATING A SLIDE-GATE NOZZLE

[75] Inventor: Dieter Beckers, Neunkirchen-Seelscheid, Fed. Rep. of Germany

[73] Assignee: Martin & Pagenstecher GmbH, Cologne, Fed. Rep. of Germany

[21] Appl. No.: 536,932

[22] Filed: Sep. 28, 1983

[30] Foreign Application Priority Data

Oct. 28, 1982 [DE] Fed. Rep. of Germany ....... 3239948

[51] Int. Cl.⁴ .............................................. B22D 41/08
[52] U.S. Cl. ................................... 222/600; 403/316; 403/328; 403/349; 285/921; 222/561
[58] Field of Search ............... 222/600, 559, 561, 504; 164/337, 437; 403/348, 349, 316, 328, 327; 285/DIG. 22; 251/236

[56] References Cited

U.S. PATENT DOCUMENTS

| | | | |
|---|---|---|---|
| 3,214,187 | 10/1965 | Fuerst | 403/328 |
| 3,679,244 | 7/1972 | Reddy | 403/328 X |
| 4,042,207 | 8/1977 | Nehrlich et al. | 222/600 X |
| 4,220,269 | 9/1980 | Beckers et al. | 222/600 |

FOREIGN PATENT DOCUMENTS 0925550  5/1982  U.S.S.R. ............................. 222/600

Primary Examiner—Joseph J. Rolla
Assistant Examiner—Louise S. Heim
Attorney, Agent, or Firm—Sprung Horn Kramer & Woods

[57] ABSTRACT

The invention relates to an arrangement for actuating a slide-gate nozzle which is installed on the bottom of a casting ladle. This arrangement comprises a cylinder/piston unit which is operated by means of a pressure medium. Elements of a coupling are, in each case, assigned to the cylinder and to the stationary portion of the slide-gate, on the one hand, and to the piston rod and to the movable portion of the slide-gate of the slide-gate nozzle, on the other hand, these elements being in engagement when in the operating position. The invention embodies the combination of the following features, namely that the elements of the first coupling comprise a quarter-turn fastener, this coupling being assigned to the stationary portion of the slide-gate, and to the cylinder, and that the elements of the second coupling comprise a latching mechanism of the snap-in type, this coupling being assigned to the movable portion of the slide-gate, and to the piston rod.

2 Claims, 8 Drawing Figures

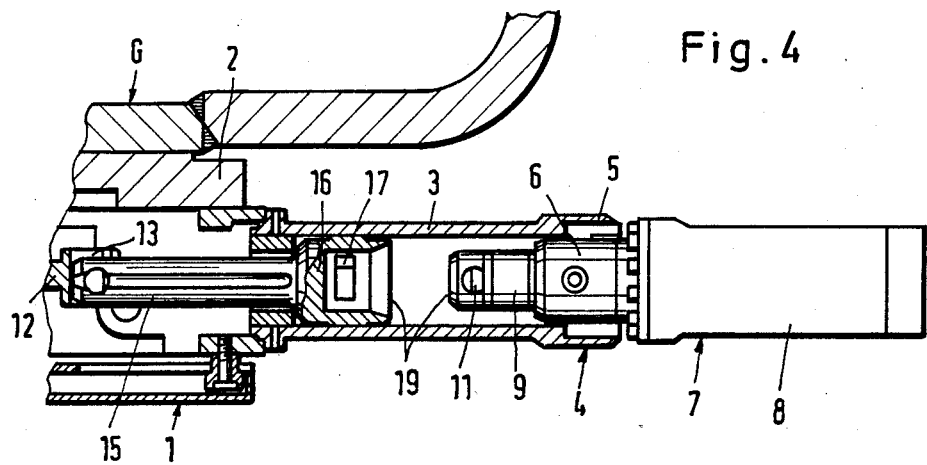
Fig. 4
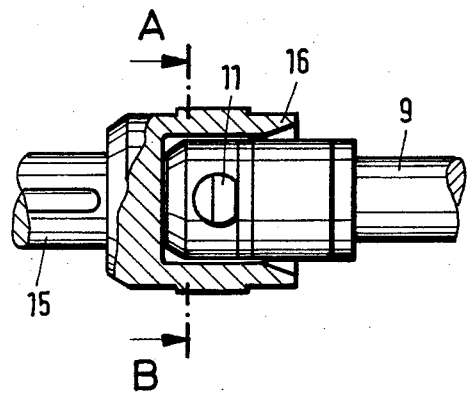
Fig. 5
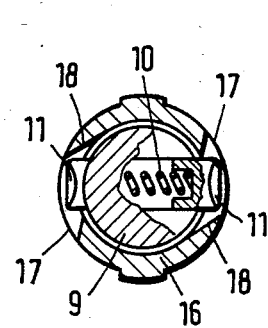
Fig. 6 (A-B)
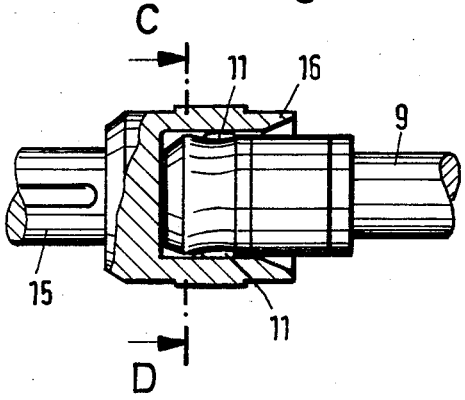
Fig. 7
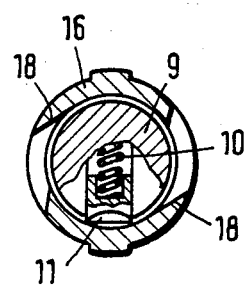
Fig. 8 (C-D)

ARRANGEMENT FOR ACTUATING A SLIDE-GATE NOZZLE

The invention relates to an arrangement for actuating a slide-gate nozzle which is installed on the bottom of a casting ladle, this arrangement comprising a cylinder/piston unit which is operated by means of a pressure medium, elements of a coupling being, in each case, assigned to the cylinder and to the stationary portion of the slide-gate, on the one hand, and to the piston rod and to the movable portion of the slide-gate of the slide-gate nozzle or, as the case may be, to an intermediate piece which is connected thereto, on the other hand, these elements being in engagement when in the operating position.

In slide-gate nozzles, a cylinder/piston unit is generally utilized for actuating the movable portion of the slide-gate, this cylinder/piston unit being operated by means of a pressure medium. The movable portion of the slide-gate essentially comprises a supporting frame, which can be slidably displaced, and which carries the refractory gate-plate. In order to generate the closing and opening movements, it is possible for the cylinder/piston unit to be functionally connected to the slide-gate nozzle, in a manner such that the connection is permanent. This, however, entails the disadvantage that a cylinder/piston unit must be present on each casting ladle. Moreover, if the cylinder/piston unit is permanently installed on the casting ladle, the possibility of the former being damaged during transportation of the casting ladle cannot be entirely ruled out, especially as the cylinder/piston unit frequently projects beyond the external outline of the ladle.

Another possibility involves the provision of only one cylinder/piston unit for several casting ladles, this unit being capable of being coupled to the slide-gate nozzle, and of being uncoupled therefrom, via suitable coupling mechanisms. The invention relates to an arrangement of this generic type.

In the case of a known design, which is generally available on the market, a guide plate is attached to the cylinder of the cylinder/piston unit, while a fitting for holding the cylinder is installed on the slide-gate nozzle, this fitting being open in a lateral direction. The cylinder/piston unit is brought into the operating position, from the side, whereby the guide plate engages into slots in the cylinder-holding fitting. The movable portion of the slide-gate is equipped with a slide-gate rod, the end of which projects into the cylinder-holding fitting. A separate coupling piece is utilized to connect the piston rod of the cylinder/piston unit to the slide-gate rod, which is associated with the movable portion of the slide-gate, the plant operators pushing this separate coupling piece, from the side, over the ends of the piston and slide-gate rods, these ends being designed with a shape resembling a hammerhead.

In the case of a similar, commercially-available design, the cylinder-holding fitting, which is likewise open in a lateral direction, is equipped with coupling springs, and the cylinder of the cylinder/piston unit possesses correspondingly shaped coupling slots. The piston rod possesses a hammerhead, and the slide-gate rod possesses a fixed receiving piece.

In both cases, it is difficult both to push the cylinder, in a lateral direction, into the cylinder-holding fitting, and to effect the connection between the piston rod and the slide-gate rod of the movable portion of the slide-gate, especially as the plant operators must, when performing these operations, work in very close proximity to the casting ladle, or even beneath the ladle, which is dangerous, especially when the ladle is full.

In addition, it is known (German Pat. No. 2,736,817) to utilize a quarter-turn fastener in order to secure the cylinder to the opened slide-gate housing. The front end of the piston rod is designed in the shape of a hammerhead, and the movable portion of the slide-gate possesses a swallowtail-type guide, extending vertically. In order to effect the connection between the piston rod and the movable portion of the slide-gate, it is necessary to bring the hammerhead into a position, relative to the swallowtail-type guide, such that the hammerhead engages into the swallowtail guide as the housing is closed. As a result, in fact, the piston/cylinder unit can be removed only when the slide-gate nozzle is in the closed state. This design has proved unsuccessful in practice. Attempts have accordingly been made to effect the connection between the piston rod and the movable portion of the slide-gate by means of a transverse pin, instead of the hammerhead, with the slide-gate housing in the closed state. This, in turn, can be achieved only if the piston rod and the movable portion of the slide-gate occupy defined positions relative to one another. This proposal, too, has not been utilized in practice.

In the case of a further known embodiment (German Offenlegungsschrift 2,603,003), the coupling elements for connecting, on the one hand, the cylinder of the cylinder/piston unit to the stationary portion of the slide-gate and, on the other hand, the connection of the coupling elements for connecting the piston rod of the cylinder/piston unit to the movable portion of the slide-gate are brought into engagement by means of a pivoting movement of the cylinder/piston unit, and are held in engagement by the tilting moment which acts in the plane of the pivoting movement. In the case of this design, too, the operating position, described above, can be reached only when the coupling elements of the piston rod and of the movable portion of the slide-gate are located in appropriate positions relative to one another.

In the abovementioned embodiments, it is frequently difficult, however, to set the relative positions.

The object underlying the present invention is now to provide an arrangement for actuating (opening and closing) a slide-gate nozzle, which arrangement permits, in a simple manner, a quick connection to be established between the cylinder of the cylinder/piston unit and the stationary portion of the slide-gate or, as the case may be, between the cylinder and an intermediate piece connected to the stationary portion, and which makes it possible to couple the piston rod of the cylinder/piston unit to the movable portion of the slide-gate in a problem-free manner.

In an arrangement of the generic type described in the introduction, this object is achieved, by means of the invention, through the combination of the following features, namely that the elements of the first coupling comprises a quarter-turn fastener, this coupling being assigned to the stationary portion of the slide-gate, and to the cylinder, and that the elements of the second coupling comprise a latching mechanism of the snap-in type, this coupling being assigned to the movable portion of the slide-gate, and to the piston rod.

In a further embodiment, the arrangement exhibits the following additional features, namely that a fitting for holding the cylinder is fastened to the stationary portion of the slide-gate, this holding fitting being configured, at its free end, as the receiving part of a quarter-turn fastener, that the cylinder of the cylinder/piston unit is, to enable it to be coupled to its holding fitting, configured, at the end where the piston rod emerges, as the associated push-in part of the quarter-turn fastener, that the free end of the piston rod of the cylinder/piston unit possesses two radially movable latches, which are located diametrally opposite one another and which are subjected to the action of compression springs, that the movable portion of the slide-gate of the slide-gate nozzle possesses, on its side facing the piston rod, a push-in claw, for the coupling operation involving the piston rod of the cylinder/piston unit, that the push-in claw is configured in a manner such that when the free end of the piston rod is pushed in, the latches snap in, under the action of the compression springs, behind two projections on the push-in claw, and such that, on rotating the cylinder/piston unit, about its longitudinal axis, through 90°, the projections release the latches for the purpose of uncoupling, and the quarter-turn fastener between the cylinder of the cylinder/piston unit and the cylinder-holding fitting is, at the same time, capable of being separated, and that the piston rod is installed, in the cylinder, in a manner which prevents it from twisting.

A further development of the arrangement according to the invention, which is used to advantage when it is desired that the quarter-turn fastener between the cylinder-holding fitting and the cylinder of the cylinder/piston unit be located at the edge of the ladle, where the plant operators have easy access to it, possesses the following features, namely that the movable portion of the slide-gate is connected, on its side facing the piston rod, to a slide-gate rod which projects into an extended cylinder-holding fitting, and which possesses a coupling head, into which the free end of the piston rod is to be pushed, that the coupling head possesses, in its side wall, two cutouts, which are located opposite one another, and into which the latches snap when the free end of the piston rod is pushed in, that, in addition, the coupling head possesses oblique run-on surfaces which, as the cylinder/piston unit is rotated, about its longitudinal axis, through 90°, press the spring-loaded latches into the piston rod, in order to effect uncoupling, while at the same time the quarter-turn fastener between the extended cylinder-holding fitting and the cylinder of the cylinder/piston unit can be released, the piston rod being installed, in the cylinder, in a manner which prevents it from twisting.

When employing the arrangement according to the invention, the coupling elements of the stationary portion of the slide-gate and of the cylinder of the cylinder/piston unit are brought, as a first coupling step, into connection with one another, in that the push-in part of the quarter-turn fastener on the cylinder, is pushed into the associated receiving part of the quarter-turn fastener at the free end of the cylinder-holding fitting, and the quarter-turn connection is established by rotating the cylinder/piston unit.

During this coupling step, the piston rod is located in its position in which it has been retracted into the cylinder. As the second coupling step, the piston rod is moved forward, by operating the cylinder/piston unit, until its free end snaps, either into the push-in claw on the movable portion of the slide-gate or, in the case of the design employing an extended cylinder-holding fitting, into the coupling head of the slide-gate rod on the movable portion of the slide-gate, snapping-in being accomplished by means of the piston-rod latches.

It is consequently possible, by means of the arrangement according to the invention, to carry out the first and second coupling steps in a simple and advantageous manner, without any necessity for the plant operators to bring, in a preliminary operation, the coupling elements into defined positions relative to one another. The uncoupling operation also becomes very easy. By rotating the cylinder/piston unit about its longitudinal axis, preferably through 90°, the quarter-turn fastener between the cylinder and the cylinder-holding fitting, is released. Since, when the cylinder/piston unit is rotated, the piston rod, which is installed, in the cylinder, in a manner which prevents it from twisting, is also rotated through 90°, at the same time, the spring-loaded latches at the free end of the piston rod are released by the push-in claw on the slidably displaceable supporting frame or, if an extended cylinder-holding fitting is used, by the coupling head on the slide-gate rod. The uncoupling operation is concluded by withdrawing the cylinder/piston unit.

In the test which follows, an illustrative embodiment of the invention is explained by reference to the drawing, in which:

FIG. 4 shows a side view, represented partially in section, of the arrangement according to the invention, connected to the slide-gate nozzle via an extended cylinder-holding fitting;

FIG. 5 shows a side view, represented partially in section, of the piston rod, the cylinder/piston unit, and the coupling head of the slide-gate rod, in the coupled position;

FIG. 6 shows a section along the line A-B in FIG. 5;

FIG. 7 shows a side view, represented partially in section, of the piston rod of the cylinder/piston unit, and of the coupling head of the slide-gate rod, with the piston rod in the uncoupled position, after having been rotated through 90° from the position shown in FIG. 5;

FIG. 8 shows a section along the line A-B in FIG. 7.

Figure 1:
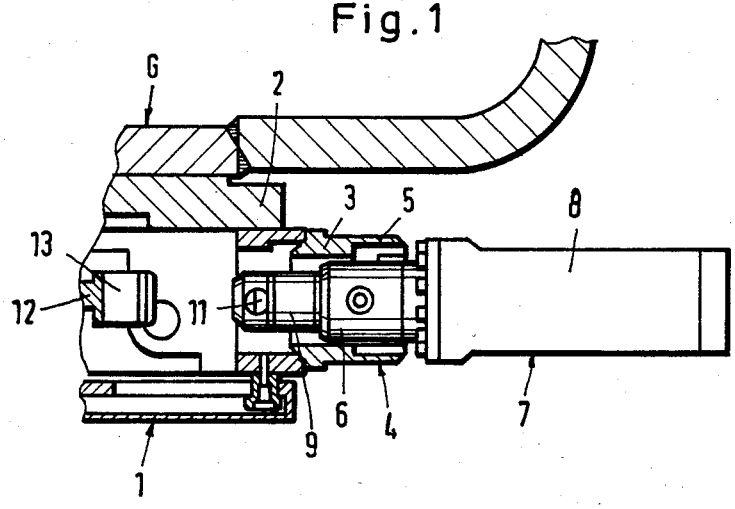
FIG. 1 shows a side view, represented partially in section, of the arrangement according to the invention, connected to the slide-gate nozzle via a short cylinder-holding fitting.
Figure 2:
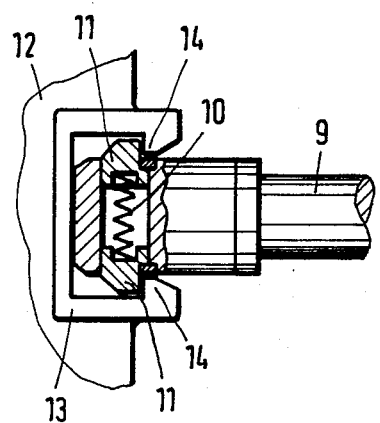
FIG. 2 shows a plan view, looking onto the supporting frame with the push-in claw, with the piston rod in the coupled position.

FIG. 1 shows a slide-gate nozzle 1, which is represented only in part, the housing of this nozzle being installed, as the stationary portion 2 of the slide-gate, on the bottom G of a casting ladle. A short cylinder-holding fitting 3 is fastened to the housing, the free end of this fitting being configured as the receiving part 5 of a quarter-turn fastener 4. The cylinder/piston unit 7, for carrying out the opening and closing operations of the slide-gate nozzle 1, comprises the cylinder 8, one of the ends of which is configured as the push-in part 6 of the quarter-turn fastener 4, and the piston rod 9. At its free end, which forms one of the parts of the latching mechanism 19 of the snap-in type, the piston rod 9 possesses two latches 11, which are connected to compression springs 10. The movable portion 12 of the slide-gate, which portion is in the form of a supporting frame, carries the gate-plate of the slide-gate nozzle 1, this plate being omitted from the drawing, and possesses, at the end facing the cylinder/piston unit 7, a push-in claw 13, as a further part of the latching mechanism 19 (see FIGS. 1 and 2).

The coupling operation is conducted in the following manner:

The plant operator pushes the push-in part 6 on the cylinder 8 of the cylinder/piston unit 7 into the receiving part 5 of the cylinder-holding fitting 3, and twists the cylinder 8, about its longitudinal axis, through 90°. This rotation locks the quarter-turn fastener 4. By actuating the cylinder/piston unit 7, the plant operator now causes the piston rod 9 to move forward, this piston rod being installed, in the cylinder 8, in a manner which prevents it from twisting. At the same time, the free end of the piston rod 9 moves into the push-in claw 13 on the supporting frame 12, the spring-loaded latches 11 snapping in, behind the projections 14 of the push-in claw 13. This concludes the coupling operation. The opening and closing operations of the slide-gate nozzle 1 can now be carried out by operating the cylinder/piston unit 7.

Figure 3:
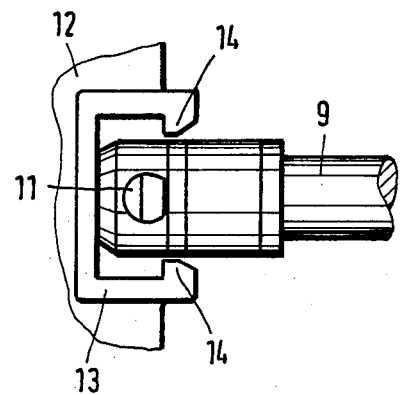
FIG. 3 shows a plan view, corresponding to FIG. 2, with the piston rod, which has been rotated through 90°, in the uncoupled position.

Once the casting operation has been completed, the uncoupling operation is conducted in the following manner:

The plant operator again rotates the cylinder 8 of the cylinder/piston unit 7, about its longitudinal axis, through 90° and thereby releases the quarter-turn fastener 4. During this operation, the piston rod 9 is also rotated through 90°, with the cylinder 8, in which it is installed in a manner which prevents it from twisting. This position is represented in FIG. 3. It shows that the projections 14 have released the latches 11. The plant operator concludes the uncoupling operation by withdrawing the cylinder/piston unit 7.

In the same way as FIG. 1, FIG. 4 shows a slide-gate nozzle 1, represented in part, the housing of this nozzle being installed, as the stationary Portion 2 of the slide-gate, on the bottom G of a casting ladle. However, an extended cylinder-holding fitting 3' is fastened to the housing, the free end of this fitting projecting beyond the edge of the ladle. As a result, the work of the plant operators is rendered easier during the coupling and uncoupling operations. As in the case of the embodiment shown in FIG. 1, the free end of the extended cylinder-holding fitting 3' is configured as the receiving part 5 of a quarter-turn fastener. The cylinder/piston unit 7 also possesses the same features as the corresponding cylinder/piston unit shown in FIG. 1. A slide-gate rod 15 is fastened to the push-in claw 13 of the supporting frame, as the movable portion 12 of the slide-gate nozzle, the coupling head 16 of this slide-gate rod 15 projecting into the cylinder-holding fitting 3', where it is supported in a manner permitting sliding displacement. As FIGS. 4, 6 and 8 show, the coupling head 16 possesses cutouts 17 at the sides, and oblique run-on surfaces 18.

The coupling operation is conducted as follows:

The plant operator pushes the push-in part 6 on the cylinder 8 of the cylinder/piston unit 7 into the receiving part 5 of the cylinder-holding fitting 3', and rotates the cylinder 8, about its longitudinal axis, through 90°. As already described with reference to FIG. 1, this operation locks the quarter-turn fastener 4. By actuating the cylinder/piston unit 7, the plant operator now causes the piston rod 9 to move forwards, this piston rod 9 being installed, in the cylinder 8, in a manner which prevents it from twisting. At the same time, as shown in FIG. 5, the free end of the piston rod 9 moves into the coupling head 16 of the slide-gate rod 15, the spring-loaded latches 11 snapping into the cutouts 17 in the side wall of the coupling head 16. FIG. 6 shows this position.

Once the casting operation has been completed, the uncoupling operation is conducted in the following manner:

The plant operator rotates the cylinder 8 of the cylinder/piston unit 7, about its longitudinal axis, through 90° and thereby releases the quarter-turn fastener 4. During this operation, the piston rod 9 is likewise rotated through 90°, this piston rod 9 being installed, in the cylinder 8, in a manner which prevents it from twisting. This position is represented in FIGS. 7 and 8. As the piston rod 9 rotates, the oblique run-on surfaces 18 push the latches 11 back, into the piston rod 9, as a result of which the locking action, with the cutouts 17, is cancelled. The plant operator concludes the uncoupling operation by withdrawing the cylinder/piston unit 7.

We claim:

1. Arrangement for actuating a slide-gate nozzle which is installed on the bottom of a casting ladle and having a stationary portion and a movable portion, the arrangement comprising a cylinder/piston unit which is operated by means of a pressure medium, elements of a coupling bearing, in each case, assigned to the cylinder and to the stationary portion of the slide-gate nozzle, on the one hand, and to the piston rod and to the movable portion of the slide-gate nozzle, on the other hand, these elements being in engagement when in the operating position, this arrangement being distinguished by the combination of the following features, namely that the elements of the first coupling comprise a quarter-turn fastener (4), this coupling being assigned to the stationary portion (2) of the slide-gate and to the cylinder (8), and that the elements of the second coupling comprise a latching mechanism (19) of the snap-in type, this coupling being assigned to the movable portion (12) of the slide-gate and to the piston rod (9), that a fitting (3) for holding the cylinder is fastened to the stationary portion (2) of the slide-gate, this holding fitting (3) being configured, at its free end, as the receiving part (5) of a quarter-turn fastener (4), that the cylinder (8) is configured, at the end where the piston rod (9) emerges, as an associated push-in part (6) of the quarter-turn fastener (4), that the free end of the piston rod (9) possesses two radially movable latches (11), which are located diametrally opposite one another and which are subjected to the action of compression springs (10), that the movable portion (12) of the slide-gate possesses, on its side facing the piston rod (9), a push-in claw (13) comprising projections (14) which hold said latches in place, said push-in claw being configured in a manner such that when the free end of the piston rod (9) is pushed in, the latches (11) snap in, under the action of the compression springs (10), behind the two projections (14), and such that, on rotating the cylinder/piston unit (7) through 90°, the projections (14) release the latches (11) for the purpose of uncoupling, and the quarter-turn fastener (4) is, at the same time, separated from the cylinder-holding fitting (3), and that the piston rod (9) is installed, in the cylinder (8), in a manner which prevents it from twisting.

2. Arrangement for actuating a slide-gate nozzle which is intalled on the bottom of a casting ladle and having a stationary portion and a movable portion, the arrangement comprising a cylinder/piston unit which is operated by means of a pressure medium, elements of a coupling being, in each case, assigned to the cylinder and to the stationary portion of the slide-gate nozzle, on the one hand, and to the piston rod and to the movable portion of the slide-gate nozzle, on the other hand, these elements being in engagment when in the operating position, this arrangement being distinguished by the combination of the following features, namely that the elements of the first coupling comprise a quarter-turn fastener (4), this coupling being assigned to the stationary portion (2) of the slide-gate and to the cylinder (8), and that the elements of the second coupling comprise a latching mechanism (19) of the snap-in type, this coupling being assigned to the movable portion (12) of the slide-gate, and to the piston rod (9), that an extended fitting (3) for holding the cylinder is fastened to the stationary portion (2) of the slide-gate, this holding fitting (3) being configured, at its free end, as the receiving part (5) of a quarter-turn fastener (4), that the cylinder (8) is configured, at the end where the piston rod (9) emerges, as an associated push-in part (6) of the quarter-turn fastener (4), that the free end of the piston rod (9) possesses a first pair of radially movable latches (11), which are located diametrally opposite one another and which are subjected to the action of compression springs (10), that the movable portion (12) of the slide-gate possesses, on its side facing the piston rod (9), a push-in claw (13) connected, on its side facing the piston rod (9), to a slide-gate rod (15) which projects into the extended cylinder-holding fitting (3'), and which possesses at one end a coupling head (16), into which the free end of the piston rod (9) is to be pushed, and at the other end, a second pair of radially movable latches, the push-in claw comprising projections (14) which hold said second pair of latches in place, said push-in claw being configured in a manner such that when the free end of the piston rod (9) is pushed in, the second pair of latches snaps in, under the action of the compression springs (10), behind the two projections (14), and in that the coupling head (16) possesses oblique run-on surfaces (18) which, as the cylinder/piston unit (7) is rotated, about its longitudinal axis through 90°, press the first pair of latches (11) into the piston rod (9) in order to effect uncoupling, while at the same time the quarterturn fastener (4) between the extended cylinder-holding fitting (3') and the cylinder (8) of the cylinder/piston unit (7) is released.

* * * * *